United States Patent [19]
Conners et al.

[15] 3,692,276
[45] Sept. 19, 1972

[54] BUTTERFLY VALVE
[72] Inventors: John A. Conners, Fairfield; Donald W. Liepelt, Madison; William H. Baulieu, Monroe, all of Conn.
[73] Assignee: Jenkins Bros., Bridgeport, Conn.
[22] Filed: May 27, 1971
[21] Appl. No.: 147,400

[52] U.S. Cl. ............................................. 251/306
[51] Int. Cl. ............................................. F16k 1/22
[58] Field of Search......251/148, 173, 305, 306, 307, 251/308

[56] References Cited

UNITED STATES PATENTS 3,253,815  5/1966  Stillwagon..............251/306 X

Primary Examiner—Henry T. Klinksiek
Attorney—James D. Bock

[57] ABSTRACT

Butterfly valve assembly for installation in a pipe line between flanges. Assembly includes rigid tubular valve body and resilient valve seat insert to make tight seal with flanges when installed and to make tight seal with valve disc in service. Seat insert has certain dimensions undersize relative to valve body so that insert may be stretched when fitted to body and is further stretched when flanges are tightened during installation. Stretching assures secure fit between insert and body before installation and leak proof seal after installation. Seat insert and valve body have cooperating radial ledges asymmetrically located to prevent relative movement when valve disc is closed.

11 Claims, 10 Drawing Figures

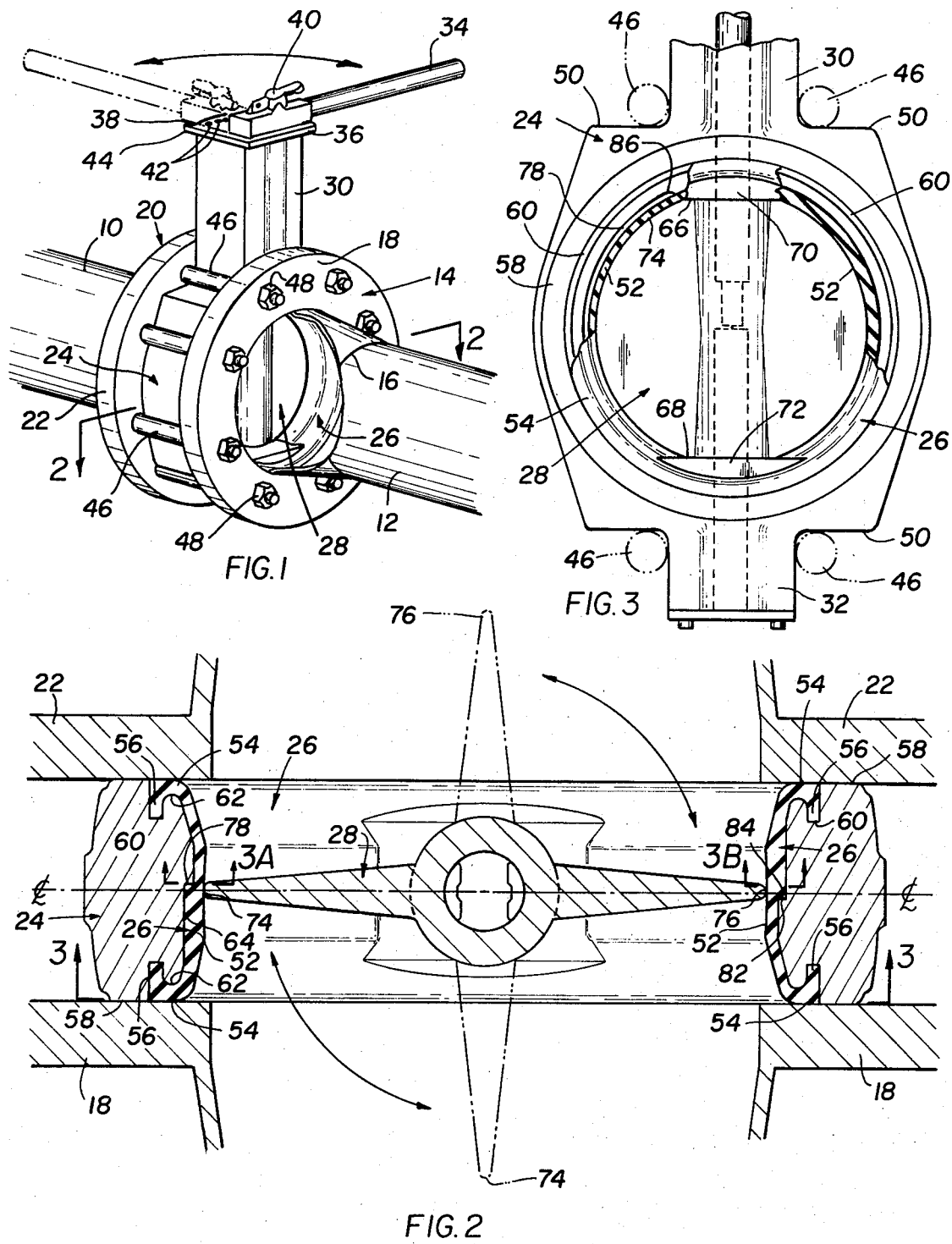

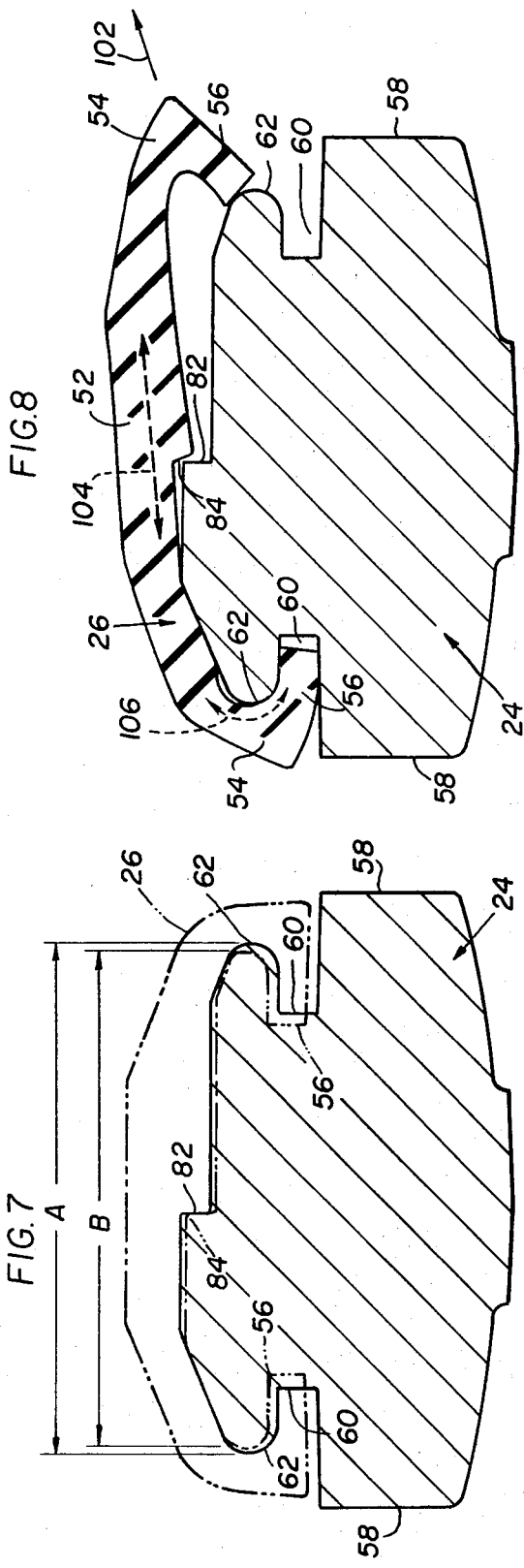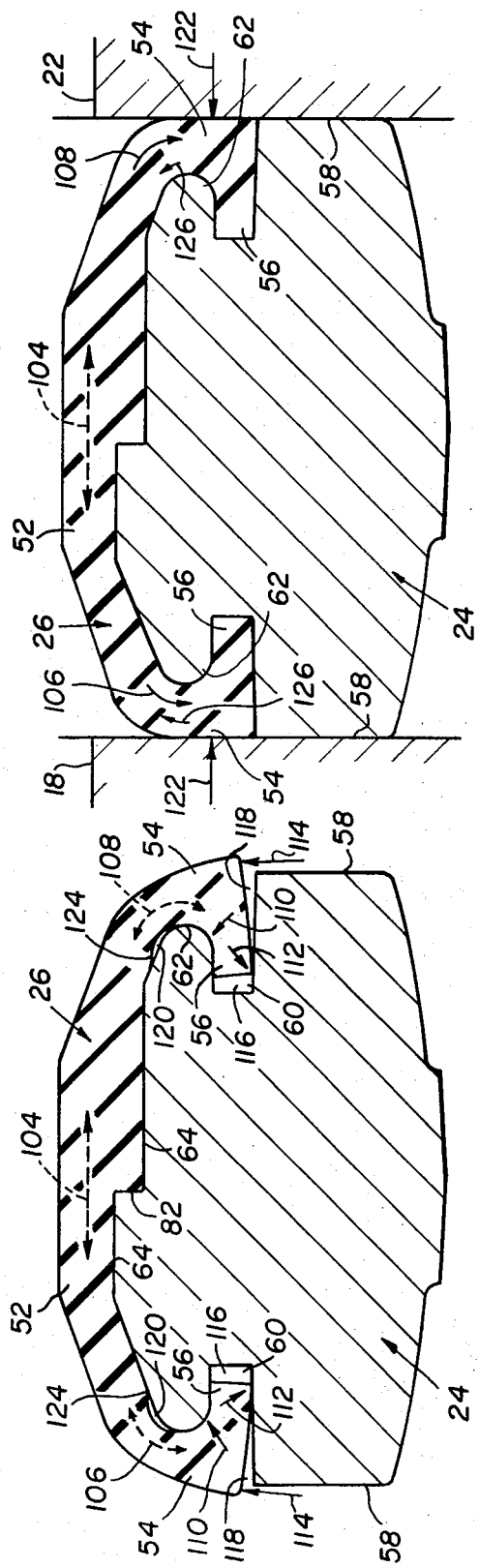

3,692,276

BUTTERFLY VALVE

BACKGROUND OF THE INVENTION

U.S. Pats. Nos. 1,844,641; 2,740,423; 2,994,342 and 3,263,960 are illustrative of butterfly valve assemblies having resilient seat inserts which serve to seal a valve body between flanges in a pipe line and also serve to form a seal with the valve disc when the latter is in closed position. Of these U.S. Pats. Nos. 2,740,423 and 2,994,342 provide at least enough, preferably more than enough, elastomeric material in the flange sealing portions of the seat insert to fill recesses formed in the valve body and the spaces between flanges and valve body when the flanges are squeezed into installed position. By so doing the excess elastomeric material in these regions is forced into the seat portion of the insert thus loosening contact between the insert and valve body in the region where a seal is to be formed with the valve disc. U.S. Pat. No. 3,263,960 provides symmetrical radial ledges in body and insert which cooperate with a disc having asymmetrical circumferential portions thus providing resistance to relative movement between insert and body when the disc is moved toward closed position. However the symmetrical ledges with asymmetrical disc edges require the latter to move through and beyond a dead-center position as they approach closed position. This results in a tendency to reduce tightness of seal in final position and also requires movement backwardly through dead-center position when the disc is moved toward open position.

BRIEF DESCRIPTION OF THE INVENTION

The resilient valve seat insert of the present invention is made of stretchable elastomeric material and is so dimensioned with respect to the valve body that it must be stretched axially of the tubular seating portion thereof to be fitted into the valve body. When thus fitted the flange sealing portions of the insert flare outwardly of the valve body, wedging the insert in fitted position. When the assembly of body and insert is squeezed between flanges of a pipe line for installation in the line the flared flange sealing portions are progressively fulcrummed into final position, further stretching the seat portion of the insert into position.

The valve body and insert are provided with cooperating radial ledges located just beyond dead center position of the disc edges in closed position. These ledges are asymmetrical whereby as the symmetrical disc edges move toward closed position the elastomeric material of the seat portion of the insert is displaced forwardly and compressively crammed against the ledges in the valve body. This assures a tight seal, assures against bodily displacement of the stretched seat portion relatively to the body as the disc moves toward closed position. When the disc is first moved toward open position, the insert can move with the disc for a small distance to facilitate opening.

BRIEF DESCRIPTION OF THE DRAWINGS

In the drawings:

FIG. 1 is an isometric view of a butterfly valve embodying the present invention showing the valve installed between flanges for service in a line and with parts broken away to reveal portions of the inner structure of the valve;

FIG. 2 is an enlarged horizontal sectional view taken along the line 2—2 in FIG. 1;

FIG. 3 is a side elevational view of the valve taken along the line 3—3 in FIG. 2, with parts broken away generally along the lines 3A and 3B in FIG. 2;

FIG. 7 is an enlarged sectional view corresponding generally with FIG. 2 showing the valve body in solid lines and showing the elastomeric valve seat in relaxed or unfitted condition in broken lines superimposed upon the valve body;

FIG. 8 is a view similar to FIG. 7 but showing the elastomeric valve seat in process of being fitted to the valve body;

FIG. 9 is a view similar to FIG. 8 but showing the elastomeric valve seat fitted on the valve body and prior to installation of the valve in a line; and FIG. 10 is a view similar to FIG. 9 but showing the position assumed by the elastomeric valve seat when the valve is installed between flanges for service in a line.

DESCRIPTION OF PREFERRED EMBODIMENT

Figure 4:
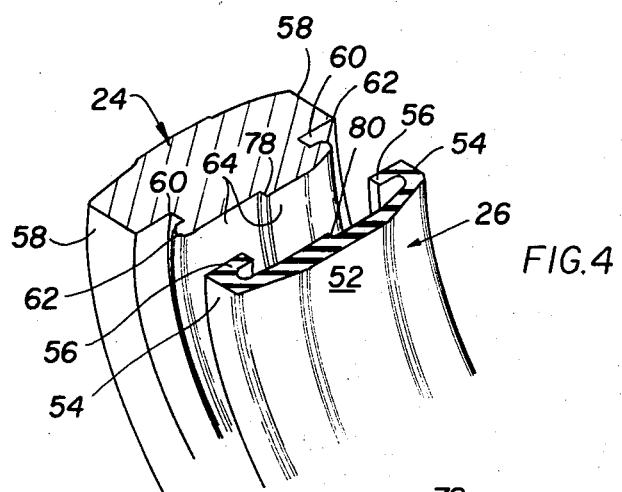
FIGS. 4, 5 and 6 are fragmentary isometric views illustrating the relationship between the valve body and the elastomeric valve seat insert of a valve embodying the present invention.

In FIG. 1 a butterfly valve embodying the present invention is shown assembled in operative relation with a line for the control of flow of a fluid under pressure. The line is illustratively shown as comprising conduits 10 and 12 each having a flange fitting secured thereto. The fitting 14 on conduit 12 is shown welded along a line 16 and having a flange 18. The fitting 20 on conduit 10 may be of the same or any desired construction and is provided with a flange 22. Obviously the fittings 14 and 20 may be of any conventional type secured to the conduits by internal or external threads, flanges or the like.

The butterfly valve of the present invention comprises a valve body 24 having a valve seat liner 26 made of elastomeric material and a valve disc 28. The valve body 24 has upper and lower necks 30 and 32 (see FIG. 3) providing bearings and seals for the stem structure on which the disc 28 is mounted to be rotated between closed and open positions, the disc 28 making an interference fit with the elastomeric valve seat liner 26 when in closed position thus to provide a leak proof closure for the line in which the valve is installed. The upper neck 30 extends for a considerable distance radially of the valve body to allow for the application of pipe insulation where required and at its outer end is provided with any suitable manual or power driven actuator for turning the stem. In FIG. 1 an actuator in the form of a simple hand lever 34 is rotatable through 90° between stops 36 and 38. The lever 34 is provided with a locking lever 40 for controlling a locking pin (not shown) which may be selectively seated in any one of a plurality of pin-receiving holes 42 formed in an index plate 44 thus to lock the lever 34 and disc 28 in open, closed or intermediate positions.

The butterfly valve thus is a wafer-like assembly which is adapted to be easily installed between flanges 18 and 22 and held in position by a plurality of bolts 46 which extend through suitable aligned openings in the flanges and are secured by nuts 48. As shown in FIG. 3 the valve body 24 is preferably provided with shoulders 50 which intersect with the necks 30 and 32 in such locations that four of the bolts 46 will fit quite snugly in the intersections and thus will serve to accurately position the valve assembly with respect to the flanges 18 and 22 during installation. For example the lowermost bolts 46, shown in FIG. 3, may be slipped loosely into the flange openings, the valve assembly (with disc 28 closed) then may be lowered into position, the uppermost bolts 46 then may be inserted loosely as the valve assembly is adjusted into proper position. After tightening the nuts 48 on these first four bolts 46 the remaining bolts and nuts may be inserted and tightened to complete the installation procedure.

Referring now to FIG. 2 the valve assembly 24, 26, 28 is shown installed between the flanges 18 and 22 and the disc 28 is shown in closed position, in full lines, with the periphery thereof pressing into the elastomeric material of the valve seat insert 26. For purposes of orientation in this description the centerline of the generally circular opening circumscribed by the valve seat insert 26 will be referred to as the axis of the valve assembly and the locations of various structural features will be described in terms of spacing radially from that axis. When words such as "upper," "lower," "right-hand" or "left-hand" are used they are used only in respect of the particular positions of parts as shown in the several views in the drawings. It will be understood, for example, that the valve assembly in FIG. 1 is shown with the hand lever 34 uppermost and certain of the other views are related with that showing. However, as will be apparent, the valve assembly may be installed in generally horizontal lines with the lever 34 up, down or at substantially any desired angle with respect to the horizontal. Also, the valve assembly may be installed in generally vertically or otherwise angularly disposed lines with the lever 34 in any position desired for convenience in operation.

A particular feature of the present invention lies in the manner in which the elastomeric seat insert 26 is fitted to the valve body 24 to assure tight seals between the seat and body, between the seat and disc 28 and between the valve body and the flanges 18 and 22. To this end the elastomeric seat insert is so sized and shaped that it must be stretched to be fitted upon the body and is further stretched when the flanges are pressed into sealing engagement with the valve body. Furthermore asymmetrical ledges are formed on the valve body 24 to mate with similar ledges on the valve seat insert 26 in positions such as to effectively prevent movement of the seat upon the body when the disc 28 is rotated to closed position.

Referring to FIGS. 2 and 4 the elastomeric seat insert 26 is provided with an annular seat portion 52 which extends axially of the valve body 24 and lies against the inner surface of the body, flange sealing portions 54 which extend radially outwardly from the seat portion 52 and beads 56 which extend axially toward one another. The valve body 24 is provided with accurately machined annular end walls 58 which meet flatwise in metal-to-metal contact with the axially opposed faces of the flanges 18 and 22 when the valve assembly is installed in final position between such flanges. The valve body 24 also has accurately machined axially extending grooves 60 extending axially inwardly from the radially outward circumference of each of the end walls 58 to receive the beads 56 of the elastomeric seat insert. The valve body 24 also has a pair of oppositely disposed annular ribs 62 which extend axially outwardly of the valve body and terminate at the high points of convexly-curved machined surfaces lying axially inwardly of the planes of end walls 58 to provide space for the flange sealing portions 54 of the seat insert 26. The curved surfaces of ribs 62 merge smoothly into the interior surfaces of grooves 60 and into the seat supporting surface 64 of the valve body 24. In the assembled and installed position shown in FIG. 2 the elastomeric material of the seat insert 26 is firmly pressed into the grooves 60 and is firmly pressed between the flanges 18 and 22 and the curved surfaces of ribs 62. As will be explained below the elastomeric material of seat insert 26 also is stretched across the curved surfaces of ribs 62 and across the seat supporting surface 64 of the valve body 24.

As shown in FIG. 3 the disc 28 is circular with flattened upper and lower ends 66 and 68 which engage mating flattened conformations 70 and 72 in the elastomeric seat insert 26 (also see FIG. 5) to form seals at such ends of the disc. The major portion of the periphery of disc 28 is circular having a diameter somewhat greater than the inside diameter of the seat portion 52 of the elastomeric seat insert 26. The circular portion of disc 28 is provided with a convex surface 74 on the left-hand side of FIG. 2 and a convex surface 76 on the right-hand side of that view. When the disc 28 is moved clockwise from the open position shown in broken lines in FIG. 2 toward the closed position shown in full lines, the convex surfaces 74 and 76 will engage the associated surface portions of the elastomeric seat insert 26 and will act as squeegees as they move on to closed position. In the closed position the surfaces 74 and 76 will press, outwardly of the axis of the valve, into the elastomeric material of the seat insert 26.

It will be appreciated that as the disc 28 is moved through the last few degrees of rotation into closed position, as just described, increasing pressure will be exerted by the surfaces 74 and 76 upon the elastomeric material of seat insert 26 with attendant increasing frictional forces which would tend to displace portions of the seat insert 26 relative to the valve body 24. Such displacement, if not prevented, tends at the least to form ripples in the elastomeric material just ahead of the advancing disc surfaces 74 and 76 with consequent bubbles or pockets between the sea insert 26 and the seat supporting surface 64 of the valve body, a frequent cause of leakage or blow-outs of prior-art elastomeric valve seat inserts. In other instances such displacement may result in unseating of the insert due to pulling the flange sealing portions of the insert away from the flanges.

Figure 5:
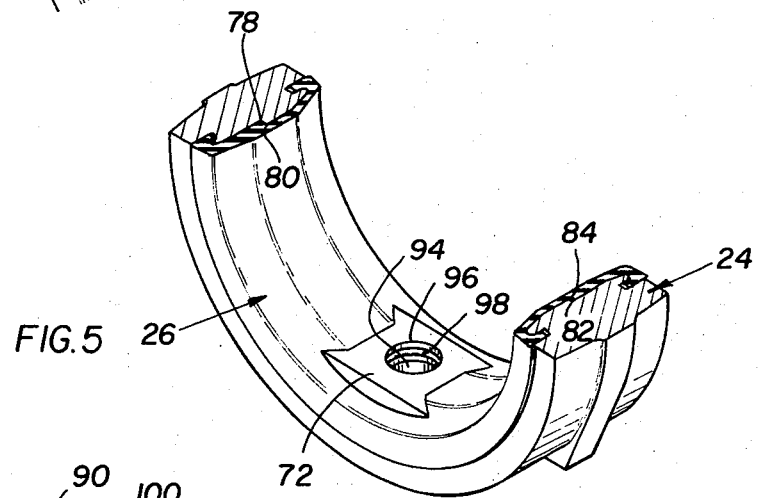

In the present invention displacement of the elastomeric seat insert 26 relative to the valve body 24 is prevented by the provision of the asymmetrical mating ledges in body and insert referred to briefly above. Referring first to FIG. 4 a ledge 78 is formed in that portion of the metal valve body 24 and a mating ledge 80 is formed in that portion of the elastomeric seat insert 26 shown, respectively, in that view. The ledge 78 comprises a flat surface lying in a plane perpendicular to the valve axis and is slightly offset from a center line extending through the axis upon which the disc 28 turns. The direction of offset and the reason therefor will be explained below. Referring to FIG. 5, in the right-hand portion of this view a ledge 82 is formed in the metal valve body 24 and a mating ledge 84 is formed in the elastomeric seat insert 26. The ledges 82 and 84 are similar to but face in opposite directions from the ledges 78 and 80 shown in FIG. 4 and on the left hand side of FIG. 5. The ledge 82 is offset from the disc center line in the opposite direction from the direction of offset of ledge 78.

Referring now to FIG. 2 it will be apparent that the ledges 78 and 80 on the left-hand side of this view are so arranged that the elastomeric material in the seat portion 52 is relatively thick in the zone in which the convex edge 74 of disc 28 sweeps when moving to closed position and that the thickness of the elastomeric material is made abruptly thinner beyond the plane in which the ledges 78, 80 mate. When the disc 28 is stopped in fully closed position the high point of the convex edge 74 thereof is in a transverse plane including the centerline CL. The radial plane in which the ledges 78 and 80 mate is offset beyond that centerline, as clearly shown in FIG. 2, whereby maximum pressure is exerted by the convex edge 74 of disc 28 on the elastomeric material extending ahead of said edge and into abutment with the metal ledge 78. As the disc sweeps into closed position it tends to push the elastomeric material ahead of it, cramming the material tightly into engagement with the ledge 78. Since, as will be more fully explained below, the elastomeric material in the seat portion 52 is stretched axially of the valve and across the seat supporting surface 64 of the valve body, the displacement of elastomeric material ahead of the disc edge 74 will simply feed some elastomeric material into the stretched thinner section of the elastomeric seat but will reduce the formation of ripples or tendency for the seat insert to move relative to the valve body.

Still referring to the left-hand side of FIG. 2 it will be appreciated that although in the closed position the disc 28 coincides with the transverse centerline of the valve the convex edge 74 thereof does not reach a dead center position with respect to the elastomeric material of the seat insert 26. Rather in fully closed position the high point of the edge 74 still lies short of the offset ledge 78 on the valve body and it continues to hold the elastic material in a distorted condition with portions of it crammed against ledge 78. The energy stored in the distorted elastomeric material pushes constantly on the edge 74 thus tending to turn the disc 28 toward open position. This assures tight closure of the valve. Thus when it is desired to open the valve assembly by rotating the disc 28 counterclockwise the locally distorted elastomeric material will assist rather than resist the initial movement of the edge 74 away from closed position. Continued movement of the edge 74 in counterclockwise direction will result in progressively reduced pressure between said edge and the surface of the elastomeric valve seat.

Referring to the right-hand side of FIG. 2 it will be apparent that the mating ledges 82 and 84 are also offset beyond the center line of the valve disc whereby the smoothly rounded edge portion 76 of disc 28 may be brought into and taken out of the fully closed position without danger of displacing or unseating of the valve seat 26 as already described in connection with the left-hand side of this FIG. Figure.

In FIG. 3, portions of the valve assembly are broken away on the left-hand side of the view to show the ledge 78 in elevation. From this Figure it will be observed that the ledge 78 extends circumferentially for a distance substantially matching the length of the rounded edge portion 74 of disc 28. Thus the ledge 78 terminates at a point 86 substantially coinciding with the point at which the flat upper surface 66 of disc 28 begins. Although not shown in FIG. 3 the opposite end of ledge 78 terminates at a point substantially coinciding with the beginning of the flat lower surface 68 of disc 28. The latter termination point is shown at 88 in FIG. 6. The termination points 86 and 88 lie quite close to the centerline on which the disc 28 is rotated and thus they are in regions wherein linear movement of the peripheral portions of the valve disc 28 for each degree of angular movement thereof is very much smaller than is the case in regions more remote from said axis of rotation. For this reason the ledge 78 is not required to extend close to said axis.

Figure 6:
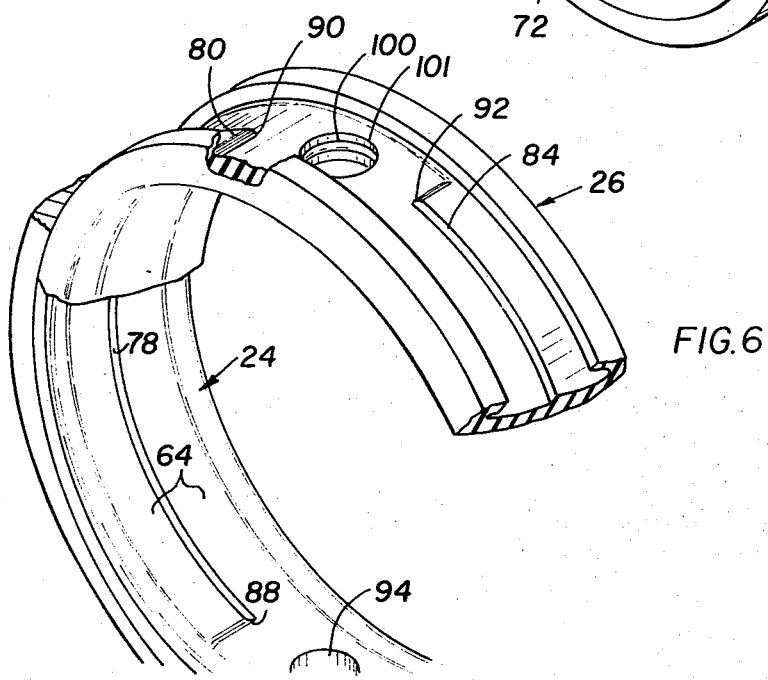

In FIG. 6 the relationship between the ledge 78 on the valve body 24 and the ledge 80 on the elastomeric valve seat insert 26 is revealed by appropriate breaking away of parts. Thus the ledge 80 terminates at a point 90 which coincides with the point 86 at which the ledge 78 terminates as shown in FIG. 3. Also in FIG. 6 the ledge 84 on the seat insert 26 is shown terminating at a point 92. It will be understood that the ledge 82 on valve body 24 will terminate at a point (not shown) which coincides with the point 92 and it also will be understood that both of the ledges 82 and 84 will have coinciding termination points toward the lower right-hand portion of the valve.

The valve body 24 (FIG. 6) is provided with an opening 94 through which the lower portion of the stem assembly of the valve disc 28 extends into the lower neck 32 (FIG. 3). In FIG. 5 the elastomeric valve seat insert 26 is provided with a lower stem-receiving opening 96 which falls into alinement with the opening 94 in the valve body. While no attempt has been made herein to show the complete sealing and bearing arrangements for the stem assembly of valve disc 28 there is shown in FIG. 5 a recess 98 molded into the elastomeric material, said recess 98 being provided to receive an O-ring with suitable retainer of familiar construction for forming a fluid tight seal between the seat insert 26 and the lower portion of the disc assembly. A similar recess 100 (FIG. 6) is shown in a corresponding opening 101 for the upper portion of the stem assembly.

As has been pointed out above the elastomeric seat insert 26 is so related in shape and dimensions with respect to the valve body 24 that the elastomeric material of which the insert 26 is made must be stretched in carefully predetermined manner for installation upon the valve body and certain regions of the insert remain under stretched conditions throughout service life. Referring first to FIG. 7, the valve body 24 is shown in full lines in a sectional view which corresponds with the section shown on the right-hand side of FIG. 2. The elastomeric seat insert 26 is shown in phantom to illustrate the corresponding cross-sectional shape thereof in a relaxed, unfitted condition which it assumes, for example, when it comes from the mold from which it was manufactured. The phantom view of the seat insert 26 is so superimposed upon the showing of the valve body 24 that the ledge 84 of the seat insert has been made to coincide with the ledge 82 of the valve body insofar as that is possible. A particular point to be noted in FIG. 7 is that the dimension A indicating the distance between the high points of the ribs 62 formed on body 24 is greater than the dimension B which indicates the distance between the points on the elastomeric seat insert 26 which will fall upon the high points of ribs 62 when the seat 26 is fitted to the valve body 24.

In FIG. 8 the step of fitting the elastomeric seat insert 26 to the body 24 has been started. One of the beads 56 of insert 26 has been positioned in the groove 60 on the left-hand side of FIG. 8 and the valve insert 26 now is being pulled in the direction of the arrow 102 thus causing the seat portions 52 to be stretched as indicated by the broken-line arrow 104 and also causing the left-hand flange sealing portion 54 to be stretched around the rib 62 as indicated by the broken-line arrow 106. To complete the fitting of the seat insert 26 the bead 56 on the right-hand side of FIG. 8 must now be forced over the curved surface of right-hand rib 62 and thereafter allowed to snap into the adjacent groove 60.

Referring now to FIG. 9 wherein fitting of the seat insert 26 to the valve body 24 has been completed it will be appreciated that, due to the continuous efforts of the stretched portions of the elastic material of seat insert 26 to return to their original dimensions, certain forces will be set up at points of contact between the insert and the valve body. In the present invention these forces serve to hold the seat 26 firmly and securely sprung into position upon the valve body 24. Thus, as indicated by the broken-line arrow 104 in FIG. 9 the seat portion 52 of the seat insert 26 is still stretched to the extent established by the difference between the dimensions A and B pointed out in FIG. 7. The recovery forces resulting from such stretched condition will continuously attempt to unhook the beads 56 and flange sealing portions 54 from the ribs 62 as indicated by the broken-line arrows 106 and 108. Unhooking, however is prevented by forces which exert pressure in opposed directions, indicated by full-line arrows 110 and 112, between the beads 56 and the valve body 24. The forces indicated by the arrows 110 and 112 react respectively against the undersides of ribs 62 and the bottom wall of each of the grooves 60 whereby the beads 56 on both sides of FIG. 9 are firmly wedged in angularly cocked positions within the grooves 60. This is the condition in which the valve assembly is delivered to the user. Because of this firmly wedged condition unseating of the elastomeric insert 26 from the valve body 24 can only be effected by the application of considerable force in specific directions, for example by prying with a bladed tool inserted between the lower surface of a bead 56 and the lower wall of the associated groove 60. Consequently the forces ordinarily encountered in handling, packing and shipping of the assembled valve will present little, if any, danger of unseating of the valve seat insert 26.

Because, as shown in FIG. 9, the beads 56 are angularly cocked within and only partially inserted into the grooves 60, the flange sealing portions 54 of the elastomeric seat insert 26 will flare outwardly beyond the planes of the walls 58 of the valve body 24. Therefore a portion of the area of the underside of each bead 56 will extend outwardly beyond and generally vertically disposed with respect to the surface of the adjacent wall 58 of the valve body 24. In the handling of the valve assembly or in installing it in a line force may be applied to these extending portions in the general directions indicated by the solid-line arrows 114. It would appear, at first impression, that such forces could rather easily unseat the insert 26. However due to the particular construction of the valve body 24 and seat insert 26 this is not the case since the first effect of any such force is to increase the wedging effect of the stretch reaction forces indicated by arrows 110 and 112. However, if a very great force is applied at a single point in the direction of one of the arrows 114 it is possible to so distort the adjacent inwardly directed portions of the bead 56 as to start withdrawal thereof from the groove 60. When it is borne in mind that the bead 56 is positioned in the groove 60 throughout the circumference of the valve assembly it will be recognized that the application of even such a force as to start dislodgment of a portion of the bead 56 at some given point on the circumference the rest of the circumference will be put under greater tension and will offer proportionately increasing resistance to dislodgment of any other circumferential portion of the bead 56. As a matter of fact the removal of the seat insert 26 from the valve body 24 by anything other than deliberately applied forces is very unlikely.

When a valve assembly consisting of a valve body 24 with an elastomeric seat insert fitted thereon in the condition shown in FIG. 9 is to be installed between flanges such as 18 and 22 (FIG. 1) in a line the firmness of seating of the seat insert 26, as just discussed above, is such that little or no danger of unseating of or damage to the seat insert may be expected. In certain cases wherein it is difficult to spread the flanges 18 and 22 apart it may be advisable for the installer to guide the leading portions of the edges of the seat insert with a screwdriver or the like. Once a small portion of the diameter of the seat insert has entered between the flanges the remaining portions will follow of necessity.

A particular advantage of the present invention lies in the fact that in all combinations of dimensions, lying within a reasonable range of manufacturing tolerances, of cooperating parts of valve body 24 and seat insert 26 it is assured that when a valve assembly is installed for service between flanges in a line the preservation of the tight fit due to longitudinal stretching of the seat portion 52 of seat insert 26 across the seat supporting surface of the valve body 24 will be assured. To accomplish this it is essential that prior art teachings such as the teachings of U.S. Pats. Nos. 2,740,423 and 2,994,342, aforesaid, be disregarded since they lead to an opposite result. In both of said patents the volume of elastomeric material in the end portions of the seat insert which are to be forced into the recesses beneath the seat supporting surface of the valve body is specified as at least as great as or greater than the volume of the recesses into which the elastomeric material is to be forced. These patents thus assure that the recesses will be filled but since the elastomeric material used for valve seat inserts is substantially incompressible the excess elastomeric material must be fed back into the already loose seat portion with inescapable further loosening thereof longitudinally of the valve. In the structure of the present invention the seat portion 52, which must be stretched longitudinally when the seat insert 26 is fitted to the valve body 24 and thus is under longitudinal tension, is even further stretched in the same direction when the flanges 18 and 22 are tightened against the ends of the valve assembly.

To fully appreciate the significance of the preceding paragraph certain practical factors must be made clear. Referring first to FIG. 9 it will be observed that there is a void 116 of generally rectangular shape lying between each of the inner ends of the beads 56 and the inner vertical wall of each of the grooves 60. There is also a void 118 of generally wedge shape lying between the lower surfaces of each of the beads 56 and the bottom wall of each of the grooves 60. Further, there is a generally crescent-shaped void 120 lying between the under surface of the seat portion 52 and the upper surface of each of the ribs 62 as well as adjacent regions of the seat supporting surface 64 of the valve body 24. These voids are present as a result of the stretching and cocking of the insert 26 upon the valve body 24 into the fitted position prior to installation of the assembly in a line. The majority of these voids must be substantially filled with elastomeric material when the valve assembly is clamped between the flanges 18 and 22, as shown in FIG. 10 to assure that the seat portion is under tensile stress and is snugly fitted to the body.

Another practical consideration is that in commercial production the dimensions of the valve body 24 and seat insert 26 cannot be assumed to be precise but can be assumed to fall within ranges of tolerance which are based upon a balance between cost and the need for greater accuracy in some locations than is needed in others. The valve body 24 preferably is made by so-called "precision casting" procedures, for example by the use of shell molds made of baked resin-impregnated materials. By this procedure the amount of machining required may be reduced. However the curved surfaces of ribs 62, the interior surfaces of grooves 60 and the surfaces of end walls 58 are machined to fairly close tolerances. This means that the dimension A in FIG. 7 may vary by a few thousandths of an inch above or below the specified dimension. It also means that the horizontal dimension between the end walls 58 and the internal dimensions of grooves 60 may vary in a similar manner. The molded elastomeric seat insert 26 also must be made within reasonable manufacturing tolerances whereby the dimension B in FIG. 7, as well as the dimensions of the flange sealing portions 54 and beads 56 may vary by plus or minus a few thousandths of an inch. Different random combinations of valve bodies and seat inserts, all individually within the established tolerance range, will exhibit cumulative or compensatory effects as well as near-perfect fits, at random as is well known by those engaged in the assembly of mass-produced parts. Obviously the basic design of the parts to be assembled must provide for acceptable performance of an assembly wherein, by chance, the worst possible combination of cumulative deviations, within tolerance, has been encountered.

Referring back to FIG. 9 it will be observed that the voids 120 terminate at axially inwardly disposed points 124 on the sloping portions of the seat supporting surface 64 of the valve body 24. When axially inwardly directed forces such as indicated by the arrows 122 in FIG. 10 are first applied to the outwardly flaring flange sealing portions 54 in the positions shown in FIG. 9 the termination points 124 will act as fulcrum points about which all portions of the seat insert extending axially outwardly of said points 124 will be forced to swing progressively as the flanges 18 and 22 are pressed inwardly. The points 124 will move progressively outwardly and eventually will cease to exist along with the voids 120. This swinging of the affected portions of the elastomeric seat insert 26 will cause substaintial stretching of the seat portion 52.

In all cases however it will be apparent that the valve seat insert provided by the present invention does not require the use of rigid or inelastic embedded bodies to stiffen or reenforce or to prevent stretching of any portion of the insert. Instead, the stretchability of the elastomeric material is availed of to assure tight sealing and seating. In all cases, too, the elastomeric material fed back as indicated by arrows 126 in FIG. 10 is fed back into a region wherein the elastomeric material is stretched much in excess of the feed back so that loosening of the seat portion 52 will not occur.

It will be recognized that the elastomeric seat insert 26 will be made of an elastomeric material suitable for the particular service for which the valve assembly is intended. Vulcanized natural rubber compounded to a suitable degree of hardness may be used where appropriate. However, synthetic elastomers are available which will withstand fluid pressure, chemical, abrasive or temperature conditions beyond the capabilities of natural rubbers. Also, specific synthetic materials may be required for use in food applications. As a particular example for use in high fluid pressure installations a Buna N elastomeric material of 70 Durometer A hardness may be used. This material, as is characteristic of the elastomeric materials which may be used in the present invention, is one which is dense, stretchable and for all practical purposes, incompressible.

The valve body 24 has been described as made of rigid material which for illustrative purposes has been assumed to be cast metal. Also the flanges 18 and 22 have been assumed to be made of metal. Accordingly expressions such as "metal-to-metal " contact have been used herein. It will be understood however that where desirable or required these rigid parts may be made of glass or of suitable rigid plastic materials as is well known in the manufacture of pipe lines and fittings for special purposes.

What is claimed is:

1. A butterfly valve assembly for installation in a pipe line between flanges having spaced parallel planar annular faces extending transversely of and centered upon the lengthwise axis of said pipe line comprising: a tubular valve body made of rigid material and having parallel planar annular end walls centered upon said axis of the pipe line in which said assembly is to be installed adapted to make face-to-face contact with said faces of said flanges, said valve body having an inner circumferential valve-seat-supporting surface extending axially of said pipe line, said valve body having a pair of oppositely disposed annular ribs each of said ribs extending axially outwardly from said valve-seatsupporting surface and each of said ribs terminating, respectively, axially inwardly of the plane of one of said end walls at the high point of a convexly-curved rib surface, a valve seat insert made of elastomeric material having a tubular seat portion the exterior circumferential surface of which is shaped to engage said valve-seat-supporting surface and the interior circumferential surface of which is shaped to define a tubular fluid passageway extending axially through said valve assembly when said seat insert is fitted upon said valve body, said insert having radially outwardly extending from each axial end thereof a flange sealing portion with a concave recess shaped to fit upon the convexly-curved rib surface of one of said ribs, a first dimension constituted by the axial distance, in said insert as molded and before it is fitted upon said valve body, between the point within the concave recess in said flange sealing portion at one axial end of said seat portion which is to fit upon the high point of one of said rib surfaces and the corresponding point in the concave recess in the flange sealing portion at the other end of said seat portion being smaller by a predetermined amount than a second dimension constituted by the axial distance between the high point of the convexly-curved rib surface of one of said pair of ribs and the high point of the convexly-curved rib surface of the other of said pair of ribs, whereby in order to fit said valve seat insert upon said valve body to prepare said butterfly valve assembly for installation in a pipe line it is necessary to stretch said tubular seat portion axially to such an extent that the concave recess of the flange sealing portion at each end of said seat portion may be forced over one of said ribs, the recovery forces exerted by said stretched seat portion thereafter being continuously effective to hold said seat portion firmly engaged with said valve-seat-supporting surface of said valve body.

2. A butterfly valve assembly for installation in a pipe line between flanges having spaced parallel planar annular faces extending transversely of and centered upon the lengthwise axis of said pipe line comprising: a tubular valve body made of rigid material and having parallel planar annular end walls centered upon said axis of the pipe line in which said assembly is to be installed adapted to make face-to-face contact with said faces of said flanges, said valve body having an inner circumferential valve-seat-supporting surface extending axially of said pipe line, said valve body having a pair of annular grooves each of said grooves extending axially inwardly from the radially inward circumference of one of said end walls and a pair of oppositely disposed annular ribs each of said ribs extending axially outwardly from said valve-seat-supporting surface and each of said ribs terminating, respectively, axially inwardly of the plane of one of said end walls at the high point of a convexly-curved rib surface which merges into an interior surface of the one of said grooves which extends from said one of said end walls; a valve seat insert made of elastomeric material having a tubular seat portion the exterior circumferential surface of which is shaped to engage said valve-seat-supporting surface and the interior circumferential surface of which is shaped to define a tubular fluid passageway extending axially through said valve assembly when said seat insert is fitted upon said valve body, said insert having radially outwardly extending from each axial end thereof a flange sealing portion with a concave recess shaped to fit upon the convexly-curved rib surface of one of said ribs and an annular bead shaped to fit into the one of said grooves into which the convexly-curved surface of said one of said ribs merges, the axial distance, in said insert as molded and before it is fitted upon said valve body, between the point within the concave recess in said flange sealing portion at one axial end of said seat portion which is to fit upon the high point of one of said rib surfaces and corresponding point in the concave recess in the flange sealing portion at the other end of said seat portion constituting a first dimension which is smaller by a predetermined amount than a second dimension constituted by the axial distance between the high point of the convexly-curved rib surface of one of said pair of ribs and the high point of the convexly-curved rib surface of the other of said pair or ribs, whereby in order to fit said valve seat insert upon said valve body to prepare said butterfly valve assembly for installation in a pipe line it is necessary to stretch said tubular seat portion axially to such an extent that the concave recess of the flange sealing portion at each end of said seat portion may be forced over one of said ribs and the bead of each flange sealing portion may be inserted into one of said grooves, the recovery forces exerted by said stretched seat portion thereafter being continuously effective to hold said seat portion firmly engaged with said valve-seat-supporting surface of said valve body.

3. A butterfly valve assembly in accordance with claim 1 in which said first dimension is so much smaller than said second dimension that when said seat insert is fitted upon said valve body the recovery forces exerted by said stretched seat portion distort the flange sealing portion at each end of said seat portion into an outwardly flared condition in which a substantial portion of each said flange sealing portion extends axially outwardly beyond the plane of one of said end walls of said valve body.

4. A butterfly valve assembly in accordance with claim 2 in which said first dimension is so much smaller than said second dimension that when said seat insert is fitted upon said valve body the recovery forces exerted by said stretched seat portion distort the flange sealing portion at each end of said seat portion into an outwardly flared condition in which a substantial portion of each said flange sealing portion extends axially outwardly beyond the plane of one of said end walls of said valve body.

5. A butterfly valve assembly in accordance with claim 4 in which the radial dimension of each said flange sealing portion is such that the annular bead forming a part of each said flange sealing portion can be inserted in each of said grooves only by stretching each said flange sealing portion in a radial direction, the recovery forces exerted by each said stretched flange sealing portion being effective to wedge the bead in the groove in which it is inserted.

6. A butterfly valve assembly in accordance with claim 1 in which a valve disc is pivoted on an axis transverse the axis of said tubular seat portion of said seat insert for oscillation through one quadrant only of a circle centered on said transverse axis in one angular direction from open to closed position and in an opposite angular direction from closed to open position, said valve disc having convex circumferential portions of an effective diameter sufficiently greater than the diameter of that portion of said interior circumferential surface of said tubular portion of said seat insert which intersects a plane transverse the axis of said tubular portion and passing through said transverse axis to provide a fluid tight interference fit between said seat insert and said disc when the latter is in closed position with the high points of said convex circumferential portions of said disc disposed in said transverse plane, said tubular seat portion having a predetermined generally uniform thickness measured radially thereof throughout the two zones on opposite sides of said transverse axis over which said circumferential portions of said disc sweep respectively when said disc is oscillated in either of said angular directions, said valve body having formed on the valve-seat-supporting surface thereof and on opposite sides of said transverse axis two radially outwardly extending generally semicircumferential ledges having faces disposed in planes substantially parallel with said transverse plane but offset beyond said transverse plane in directions axially of said valve body which are continuations of the directions in which said convex edges of said valve disc move towards closed position, and said inner circumferential surface of said tubular seat portion of said valve seat insert having formed thereon on opposite sides of said transverse axis two radially inwardly extending ledges having faces which mate respectively with said faces of said ledges on said valve body in the planes in which said latter ledges are disposed.

7. A butterfly valve assembly in accordance with claim 6 in which said planes which are parallel with said transverse plane are offset beyond said transverse plane by a distance which is less than said predetermined thickness.

8. A butterfly valve assembly in accordance with claim 6 in which the thickness measured radially of the two zones of said tubular seat portion of said valve seat insert which extend beyond the planes in which the faces of said ledges on said valve body and said insert mate in directions axially of said tubular seat portion which are continuations of the directions in which said convex edges of said valve disc move towards closed position is less than said predetermined thickness by an amount substantially equal to the distance by which said ledges on said valve-seat-supporting surface of said valve body extend radially outwardly of said last-named surface.

9. A butterfly valve assembly in accordance with claim 2 in which a valve disc is pivoted on an axis transverse the axis of said tubular seat portion of said seat insert for oscillation through one quadrant only of a circle centered on said transverse axis in one angular direction from open to closed position and in an opposite angular direction from closed to open position, said valve disc having convex circumferential portions of an effective diameter sufficiently greater than the diameter of that portion of said interior circumferential surface of said tubular portion of said seat insert which intersects a plane transverse the axis of said tubular portion and passing through said transverse axis to provide a fluid tight interference fit between said seat insert and said disc when the latter is in closed position with the high points of said convex circumferential portions of said disc disposed in said transverse plane, said tubular seat portion having a predetermined generally uniform thickness measured radially thereof throughout the two zones on opposite sides of said transverse axis over which said circumferential portions of said disc sweep respectively when said disc is oscillated in either of said angular directions, said valve body having formed on the valve-seat-supporting surface thereof and on opposite sides of said transverse axis two radially outwardly extending generally semicircumferential ledges having faces disposed in planes substantially parallel with said transverse plane but offset beyond said transverse plane in directions axially of said valve body which are continuations of the directions in which said convex edges of said valve disc move towards closed position, and said inner circumferential surface of said tubular seat portion of said valve seat insert having formed thereon on opposite sides of said transverse axis two radially inwardly extending ledges having faces which mate respectively with said faces of said ledges on said valve body in the planes in which said latter ledges are disposed.

10. A butterfly valve assembly in accordance with claim 9 in which said planes which are parallel with said transverse plane are offset beyond said transverse plane by a distance which is less than said predetermined thickness.

11. A butterfly valve assembly in accordance with claim 9 in which the thickness measured radially of the two zones of said tubular seat portion of said valve seat insert which extend beyond the planes in which the faces of said ledges on said valve body and said insert mate in directions axially of said tubular seat portion which are continuations of the directions in which said convex edges of said valve disc move towards closed position is less than said predetermined thickness by an amount substantially equal to the distance by which said ledges on said valve-seat-supporting surface of said valve body extend radially outwardly of said last-named surface.

* * * * *

UNITED STATES PATENT OFFICE
CERTIFICATE OF CORRECTION

PO-1050
(5/69)

Patent No. 3,692,276            Dated September 19, 1972

Inventor(s)    John A. Conners, et al.

It is certified that error appears in the above-identified patent and that said Letters Patent are hereby corrected as shown below:

Abstract

Line 7 - "may" should be --must--

Signed and sealed this 13th day of February 1973.

(SEAL)
Attest:

EDWARD M. FLETCHER, JR.                     ROBERT GOTTSCHALK
Attesting Officer                           Commissioner of Patents